United States Patent
Tanner

(10) Patent No.: US 7,480,112 B2
(45) Date of Patent: *Jan. 20, 2009

(54) DISK DRIVE APPARATUS HAVING SHOCK ADAPTIVE FILTERS

(75) Inventor: Brian K. Tanner, San Jose, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/729,601

(22) Filed: Mar. 28, 2007

(65) Prior Publication Data

US 2008/0239546 A1    Oct. 2, 2008

(51) Int. Cl.
*G11B 17/00*    (2006.01)
*G11B 27/36*    (2006.01)

(52) U.S. Cl. .......................................... 360/69; 360/31

(58) Field of Classification Search ........................ None
See application file for complete search history.

(56) References Cited

U.S. PATENT DOCUMENTS 5,696,645 A * 12/1997 Laughlin ..................... 360/75
6,597,532 B1 * 7/2003 Usui et al. ................. 360/97.03
6,744,577 B1 * 6/2004 Guo et al. ...................... 360/31
6,898,046 B2 * 5/2005 Sri-Jayantha et al. ..... 360/77.02
6,937,422 B2 * 8/2005 Dang et al. ............... 360/77.02
2005/0057833 A1 * 3/2005 Hirano et al. .................. 360/31
2007/0217052 A1 * 9/2007 Semba et al. .................. 360/75

FOREIGN PATENT DOCUMENTS

JP    2001291348    10/2001
JP    179110    7/2006

* cited by examiner

*Primary Examiner*—Jason C Olson
(74) *Attorney, Agent, or Firm*—Schwegman, Lundberg & Woessner, P.A.

(57) ABSTRACT

According to one embodiment, a disk drive apparatus includes a sensor to detect mechanical shocks to the disk drive apparatus and to provide a shock output signal representative of such mechanical shocks, a first filter coupled to the sensor to filter the shock output signal to pass signals having a first frequency component, a second filter to independently filter the shock output signal to provide signals having a second frequency component, a detector to inhibit write operations of the disk drive apparatus responsive to the shock output signal from the first filter, and a controller coupled to the second filter to compensate for low frequency mechanical disturbances during write operations to a track on the disk drive apparatus responsive to low frequency component.

20 Claims, 6 Drawing Sheets

DISK DRIVE APPARATUS HAVING SHOCK ADAPTIVE FILTERS

FIELD

The present invention relates to a disk drive device and method for compensating for mechanical disturbances detected by the shock sensor.

BACKGROUND

A disk drive is an information storage device. A disk drive includes one or more disks clamped to a rotating spindle, and at least one head for reading information representing data from and/or writing data to the surfaces of each disk. The head is supported by a suspension coupled to an actuator that may be driven by a voice coil motor. Control electronics in the disk drive provide electrical pulses to the voice coil motor to move the head to desired positions on the disks to read and write the data in circular tracks on the disks, and to park the head in a safe area when not in use or when otherwise desired for protection of the disk drive.

Certain mechanical shocks to disk drives can cause the head or heads to write data outside an intended track if the shock occurs during or just prior to a write. Adjacent user track data can become corrupted if such writes are allowed to continue. Some disk drives detect shocks, sometimes referred to as sharp jerk events, and attempt to prevent the writing of data when certain shocks are detected.

Not all shocks may result in corruption of adjacent track data if writes are allowed to continue. However, such writes may result in data being written off center from the track, making it more difficult to read.

DETAILED DESCRIPTION

Hereinafter, example embodiments of the present invention will be described with reference to the drawings.

Figure 1:
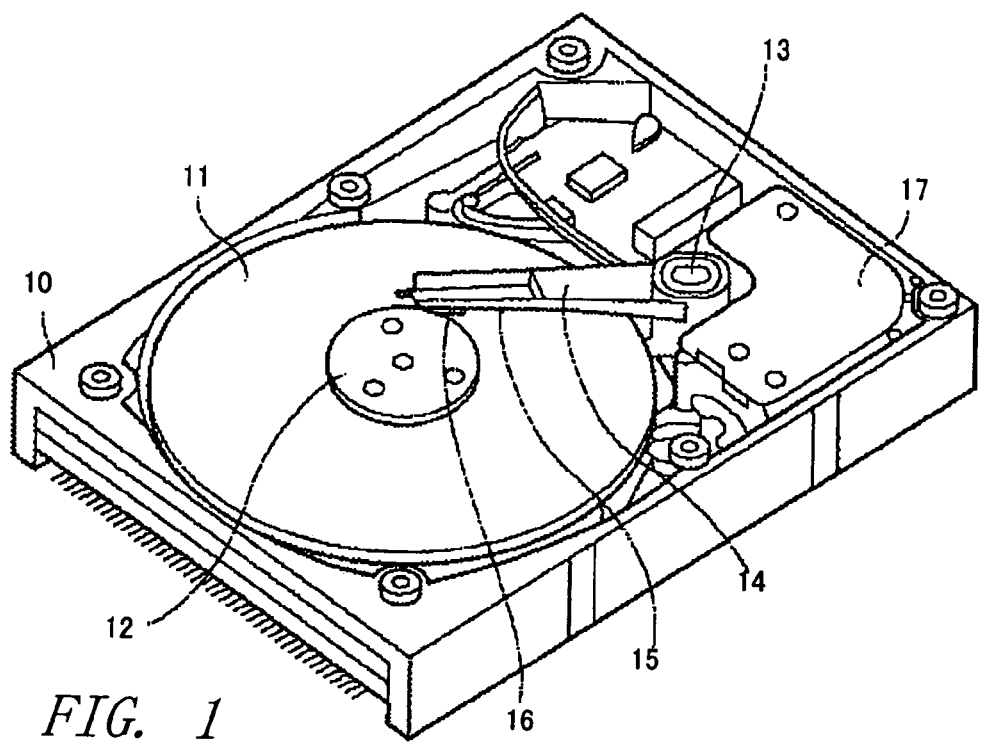
FIG. 1 is a perspective view of a magnetic recording and reproducing apparatus (hard disk drive) according to an example embodiment.

FIG. 1 is a perspective view of a magnetic recording and reproducing apparatus (hard disk drive) according to an embodiment. The magnetic recording and reproducing apparatus comprises, inside a chassis 10, a magnetic disk 11, a head slider 16 including a read head and a write head, a head suspension assembly (a suspension 15 and an actuator arm 14) that supports the head slider 16, a voice coil motor (VCM) 17 and a circuit board.

The magnetic disk (discrete track media) 11 is mounted on and rotated by a spindle motor 12. Various digital data are recorded on the magnetic disk 11 in a perpendicular magnetic recording manner. In an example embodiment, the magnetic head incorporated in the head slider 16 is a so-called integrated head including a write head of a single pole structure and a read head using a shielded MR read element (such as a GMR film or a TMR film). The suspension 15 is held at one end of the actuator arm 14 to support the head slider 16 so as to face the recording surface of the magnetic disk 11. The actuator arm 14 is attached to a pivot 13. The voice coil motor (VCM) 17, which serves as an actuator, is provided at the other end of the actuator 14. The voice coil motor (VCM) 17 drives the head suspension assembly to position the magnetic head at an arbitrary radial position of the magnetic disk 11. The circuit board comprises a head IC to generate driving signals for the voice coil motor (VCM) and control signals for controlling read and write operations performed by the magnetic head.

Figure 2:
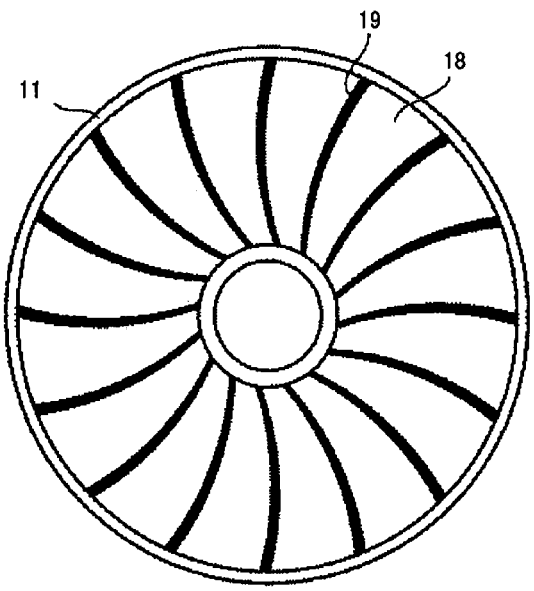
FIG. 2 is a schematic plan view of a magnetic disk according to an example embodiment.

FIG. 2 is a schematic plan view of a magnetic disk 11 according to an embodiment. FIG. 2 shows data zones 18 and servo zones 19. User data is recorded in each of the data zones 18. This example magnetic disk is a so-called DTR (discrete track recording) media having discrete tracks formed of concentric magnetic patterns. The recording tracks will be described later by way of example with reference to FIG. 3. Servo data for head positioning is formed in each of the servo zones 19 as patterns of a magnetic material and a nonmagnetic material. On the disk surface, the servo zone 19 is shaped like a circular arc corresponding to a locus of a head slider during access. Each servo zone 19 is formed so that its circumferential length is larger as its radial position is closer to its outermost periphery.

Figure 3:
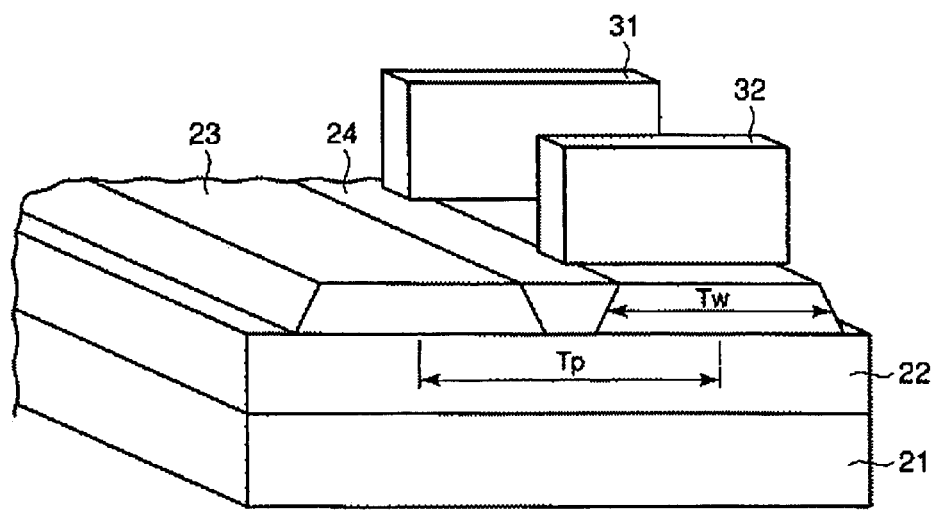
FIG. 3 is a perspective view of a data zone in a magnetic disk according to an example embodiment.

FIG. 3 is a perspective view of a data zone in a magnetic disk according to an embodiment. A soft underlayer 22 is formed on a substrate 21. Magnetic patterns constituting the recording tracks 23 and guard bands 24 made of a nonmagnetic material are alternately formed along a radial direction, and thus the recording tracks 23 are separated by the guard bands 24. The radial width and track pitch of the recording track 23 are denoted as Tw and Tp, respectively. The radial width Tw is formed to be larger than the width of the guard band 24. In the present example embodiment, the ratio of the magnetic material to the nonmagnetic material in the radial direction is 2:1, that is, the occupancy rate of the magnetic material is set to 67%. A GMR element 31 of a read head and a single pole 32 of a write head, which are formed in the head slider, are positioned above the recording track 23.

As the substrate 21, a flat glass substrate may be used. The substrate 21 is not limited to the glass substrate but an aluminum substrate (or any other suitable substrate) may be used. As the ferromagnetic material forming the recording track 23, CoCrPt may be used. As the guard band 24, nonmagnetic $SiO_2$ may be used to fill the grooves that separate CoCrPt. The guard bands 24 may be the grooves themselves into which no material is filled. In FIG. 3, $SiO_2$ is filled into the grooves between the recording tracks 23 and then $SiO_2$ is flattened, thereby forming the guard bands 24. Although not shown, a protective film of diamond-like carbon (DLC) may be formed on the surfaces of the recording tracks 23 and guard bands 24. Lubricant may be then applied to the surface of the protective film. If SiO$_2$ is not filled into the grooves between the recording tracks 23, the protective layer may be formed directly on the protruded and recessed surfaces of the recording tracks 23.

Figure 4:
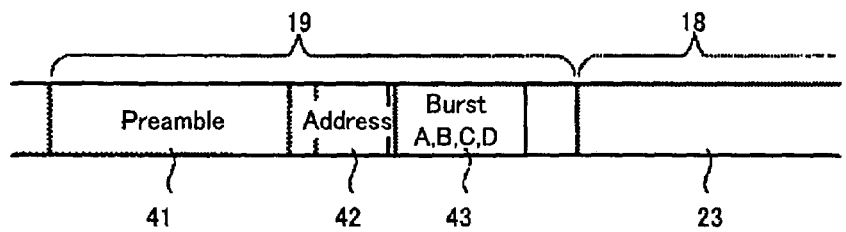
FIG. 4 is a schematic diagram showing a servo zone and a data zone in a magnetic disk according to an example embodiment.
Figure 5:
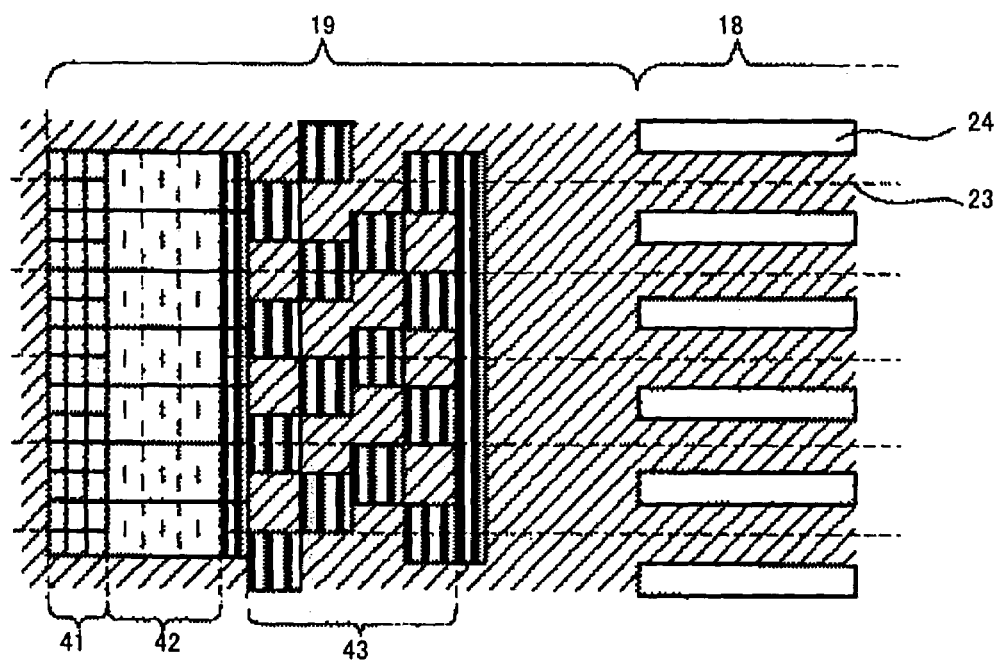
FIG. 5 is a plan view showing patterns in a servo zone and a data zone in a magnetic disk according to an example embodiment.

With reference to FIGS. 4 and 5, the patterns of the servo zone and data zone will be described. As schematically shown in FIG. 4, the servo zone 19 includes a preamble section 41, an address section 42, and a burst section 43 for detecting deviation.

As shown in FIG. 5, the data zone 18 includes the recording tracks 23 formed of magnetic patterns, and the guard bands 24 made of a nonmagnetic material. Patterns of the magnetic and nonmagnetic materials which provide servo signals are formed in each of the preamble section 41, address section 42, and burst section 43 in the servo zone 19. These sections may have the functions described below.

The preamble section 41 is provided to execute a PLL process for synthesizing a clock for a servo signal read relative to deviation caused by rotational deflection of the media, and an AGC process for maintaining appropriate signal amplitude. The preamble section 41 has patterns of the magnetic and nonmagnetic materials substantially constituting circular arcs without being separated in the radial direction and repeatedly formed in the circumferential direction. The area ratio of the magnetic material to nonmagnetic material in the preamble section 41 may be approximately 1:1, that is, the occupancy rate of the magnetic material is approximately 50%.

The address section 42 may have servo signal recognition codes called servo marks, sector data, cylinder data, and the like formed at the same pitch as that of the preamble section 41 in the circumferential direction using Manchester encoding. In particular, since the cylinder data has a pattern exhibiting a data varied for every servo track, it may be recorded using Manchester encoding after being converted into Gray codes providing the minimum difference between adjacent tracks so as to reduce the adverse effect of address reading errors during a seek operation. Also in the address section 42, the occupancy rate of the magnetic material is approximately 50%.

The burst section 43 is an off-track detecting region used to detect the amount of off-track with respect to the on-track state for a cylinder address. The burst section 43 is shown by way of example to have four fields of burst marks (called an A, B, C, and D bursts), whose pattern phases in a radial direction are shifted to each other in respective fields. Plural marks are arranged at the same pitch as that of the preamble section in the circumferential direction. The radial period of each burst is proportional to the period at which the address pattern changes, in other words, the servo track period. According to the present example embodiment, respective bursts are formed in a length of 10 periods in the circumferential direction. The bursts are repeated in the radial direction in a period twice as long as the servo track period. In the burst section 43, the occupancy rate of the magnetic material is approximately 75%.

Each of the marks in the burst section 43 may be designed to be a rectangle, or more precisely, a parallelogram taking the skew angle during head access into account. The mark may be slightly rounded depending on precision in stamper processing or processing performance for transfer formation and the like. The principle of detection of a position on the basis of the burst section 43 will not be described in detail. The off-track amount is obtained by calculating the average amplitude value of read signals from the A, B, C, and D bursts.

Figure 6:
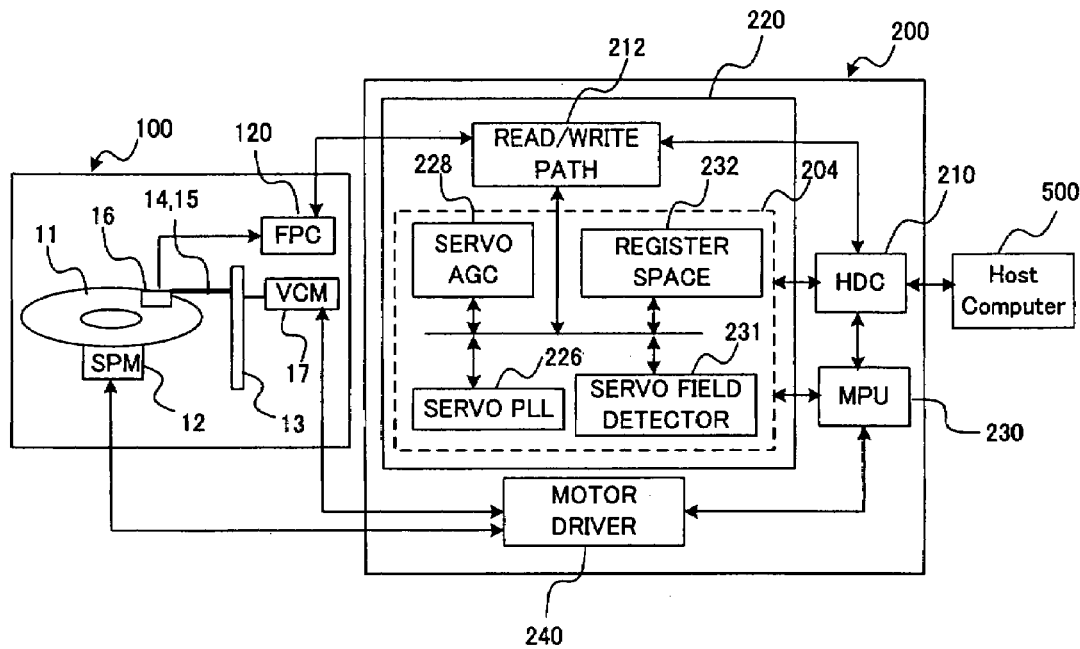
FIG. 6 is a block diagram of the magnetic recording and reproducing apparatus (hard disk drive) according to an example embodiment.

FIG. 6 shows a block diagram of the magnetic recording and reproducing apparatus (hard disk drive) according to an example embodiment. This figure shows the head slider 16 only above the top surface of the magnetic disk 11. However, the perpendicular magnetic recording layer with discrete tracks is formed on each side of the magnetic disk. A down head and an up head are provided above the bottom and top surfaces of the magnetic disk, respectively.

The disk drive includes a main body unit called a head disk assembly (HDA) 100 and a printed circuit board (PCB) 200.

As shown in FIG. 6, the head disk assembly (HDA) 100 has the magnetic disk (discrete track media) 11, the spindle motor 12, which rotates the magnetic disk 11, the head slider 16, including the read head and the write head, the suspension 15 and actuator arm 14, the voice coil motor (VCM) 17, and a head amplifier (HIC), which is not shown. The head slider 16 is provided with the read head including the GMR element 31 and the write head including the single pole 32, which are shown in FIG. 3.

The head slider 16 may be elastically supported by a gimbal provided on the suspension 15. The suspension 15 is attached to the actuator arm 14, which is rotatably attached to the pivot 13. The voice coil motor (VCM) 17 generates a torque around the pivot 13 for the actuator arm 14 to move the head in the radial direction of the magnetic disk 11. The head amplifier (HIC) is fixed to the actuator arm 14 to amplify input signals to and output signals from the head. The head amplifier (HIC) is connected to the printed circuit board (PCB) 200 via a flexible print cable (FPC) 120. Providing the head amplifier (HIC) on the actuator arm 14 may effectively reduce noise in the head signals. However, the head amplifier (HIC) may be fixed to the HDA main body.

As described above, the perpendicular magnetic recording layer is formed on each side of the magnetic disk 11, and the servo zones 19, each shaped like a circular arc, are formed so as to correspond to the locus of the moving head. The specifications of the magnetic disk meet outer and inner diameters and read/write characteristics adapted to a particular drive. The radius of the circular arc formed by the servo zone 19 is given as the distance from the pivot to the magnet head element.

In the illustrated example embodiment, four major electronic components, so-called system LSIs, are mounted on the printed circuit board (PCB) 200. The system LSIs are a disk controller (HDC) 210, a read/write channel IC 220, a MPU 230, and a motor driver IC 240.

The MPU 230 is a control unit of a driving system and includes ROM, RAM, CPU, and a logic processing unit which implement a head positioning control system according to the present example embodiment. The logic processing unit is an arithmetic processing unit comprise a hardware circuit to execute high-speed calculations. Firmware (FW) for the logic processing circuit is saved to the ROM. The MPU controls the drive in accordance with FW.

The disk controller (HDC) 210 is an interface unit in the hard disk drive which manages the whole drive by exchanging information with interfaces between the disk drive and a host computer 500 (for example, a personal computer) and with the MPU 230, read/write channel IC 220, and motor driver IC 240.

The read/write channel IC 220 is a head signal processing unit relating to read/write operations. The read/write channel IC 220 is shown as including a read/write path 212 and a servo demodulator 204. The read/write path 212, which can be used to read and write user data and servo data, may include front end circuitry useful for servo demodulation. The read/write path 212 may also be used for writing servo information in self-servowriting. It should be noted that the disk drive also includes other components, which are not shown because they are not necessary to explain the example embodiments.

The servo demodulator 204 is shown as including a servo phase locked loop (PLL) 226, a servo automatic gain control (AGC) 228, a servo field detector 231 and register space 232. The servo PLL 226, in general, is a control loop that is used to provide frequency and phase control for the one or more timing or clock circuits (not shown in FIG. 6), within the servo demodulator 204. For example, the servo PLL 226 can provide timing signals to the read/write path 212. The servo AGC 228, which includes (or drives) a variable gain amplifier, is used to keep the output of the read/write path 212 at a substantially constant level when servo zones 19 on one of the disks 11 are being read. The servo field detector 231 is used to detect and/or demodulate the various subfields of the servo zones 19, including a SAM, a track number, a first phase servo burst, and a second phase servo burst. The MPU 230 is used to perform various servo demodulation functions (e.g., decisions, comparisons, characterization and the like), and can be thought of as being part of the servo demodulator 204. In the alternative, the servo demodulator 204 can have its own microprocessor.

One or more registers (e.g., in register space 232) can be used to store appropriate servo AGC values (e.g., gain values, filter coefficients, filter accumulation paths, etc.) for when the read/write path 212 is reading servo data, and one or more registers can be used to store appropriate values (e.g., gain values, filter coefficients, filter accumulation paths, etc.) for when the read/write path 212 is reading user data. A control signal can be used to select the appropriate registers according to the current mode of the read/write path 212. The servo AGC value(s) that are stored can be dynamically updated. For example, the stored servo AGC value(s) for use when the read/write path 212 is reading servo data can be updated each time an additional servo zone 19 is read. In this manner, the servo AGC value(s) determined for a most recently read servo zone 19 can be the starting servo AGC value(s) when the next servo zone 19 is read.

The read/write path 212 includes the electronic circuits used in the process of writing and reading information to and from the magnetic disks 11. The MPU 230 can perform servo control algorithms, and thus, may be referred to as a servo controller. Alternatively, a separate microprocessor or digital signal processor (not shown) can perform servo control functions.

Figure 7:
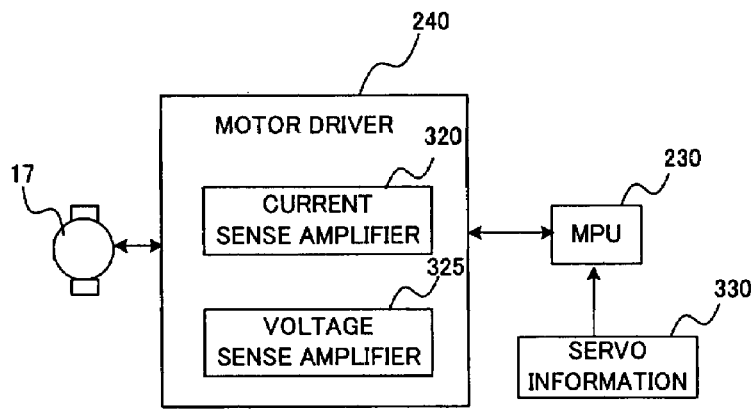
FIG. 7 is a block schematic diagram of a voice coil motor driver according to an example embodiment.

FIG. 7 is a block schematic diagram of a voice coil motor driver 240 according to an example embodiment. The voice coil motor driver 240 is coupled to a voice coil motor 17 for driving it at desired levels. The voice coil motor driver 240 includes a current sense amplifier 320 that senses current through the voice coil motor 17, and also includes a voltage sense amplifier 325 that senses voltage across the voice coil motor 17. These measurements provide an accurate value of voice coil motor resistance. A small back EMF voltage generated by the voice coil moving in the motor can be measured. This back EMF voltage is proportional to the voice coil motor velocity, which may also be measured from read servo information as indicated in block 330.

The voice coil motor resistance may be measured during a seek operation whereby correlation between the measured voice coil motor velocity via servo demodulation (see block 330) that determines data head radial position, and back EMF based velocity measured gives an estimate of voice coil motor resistance. This way, an accurate voice coil motor resistance can be determined during seek operations, allowing rapid and accurate head parking functions. Processing of the back EMF measurements may be performed by the MPU 230 coupled to the motor driver 240 and the servo information (see block 330).

Figure 8:
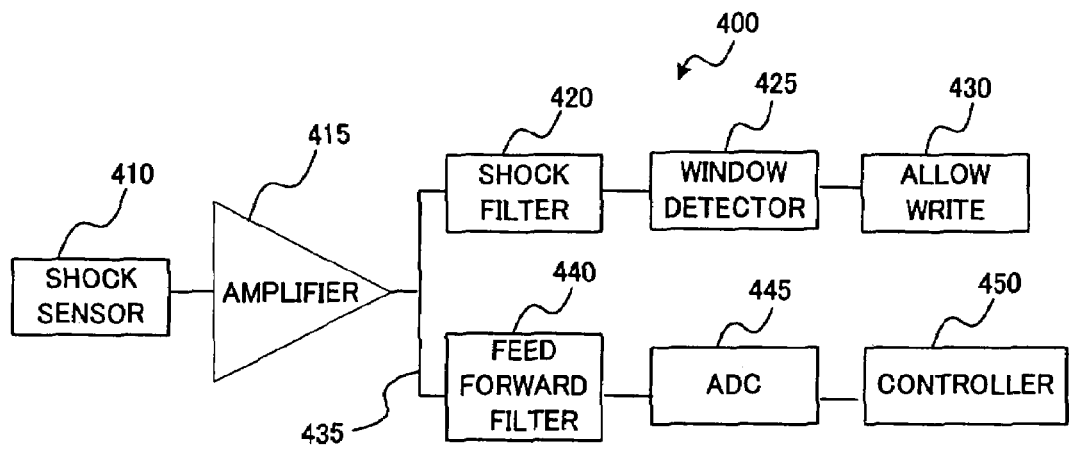
FIG. 8 is a block diagram of a shock detection channel according to an example embodiment.

FIG. 8 illustrates an example shock detection channel generally at 400. Shock detection channel 400 in one example embodiment comprises a motor driver, such as an ASIC, in addition to a shock sensor 410. In one example embodiment, the shock detection channel 400 is internal to the ASIC. An example configuration uses the shock detection channel 400 to detect sharp jerk events (mechanical shock) in order to inhibit write operation and protect adjacent track user data from corruption during disk write transfers. A quick detection of any jerk event may help prevent such corruption. In one example embodiment, the shock detection channel 400 incorporates a piezoelectric shock sensor charge amplifier or other suitable amplifier 415 coupled to a shock filter 420 and a window detector 425.

The piezoelectric shock sensor 410 may be a piezoelectric element attached to a charge amplifier (e.g., the amplifier 415) and generates a voltage or charge proportional to the applied force in an axis. The axis in one example embodiment may be selected to be essentially 45°x, 45°y and 25°z. This may provide the ability to react to any applied force on the drive in either the x, y or z axis. Z axis disturbances may not be as detrimental to disk drive performance, and may be detuned is some embodiments if desired.

In one example embodiment, an output (see allow write 430) of the window detector 425 is used to allow write transfers to the disk when the signal is within a window where the magnitude of the detected forces is below some predetermined level, and inhibit write transfers when the detected forces are outside the window. In one example embodiment, window detector 425 may be any type of controller that analyzes an input signal to determine whether or not to inhibit or allow writes. Simple thresholds may be used, or other algorithms that determine whether a shock event, as represented by the high frequency components, may be detrimental to write operations.

A modification of the shock channel allows a second action to occur, which may occur simultaneously with the allowing or inhibiting of write transfers. The shock detection channel 400 provides a separate alternate signal path 435 to filter an output from the shock sensor 410. The separate alternate signal path 435 includes a feed forward filter 440 that presents a filtered signal to an ADC 445. ADC 445 is coupled to a controller 450, such as a firmware controller, to add a compensation signal to a position control loop. Thus, the shock in the separate path may be used to compensate for mechanical disturbances detected by the shock sensor 410. The frequency of the compensated disturbances may be substantially lower than the frequencies used to detect a shock event and prevent writes. As the shock filter 420 and the feed forward filter 440 may be implemented as separate filters their design may be optimized for the particular function they are to perform. Accordingly, the design of the feed forward filter 440 need not be compromised by the requirements of the shock filter 420. Likewise, the design of the shock filter 420 need not be compromised by the requirements of the feed forward filter 440. Thus, in an example embodiment, a feed forward filter 440 is a low pass type that rejects noise inherent in the shock detection channel 400. This additional filter 440 does not degrade the performance of the shock channel in quickly detecting shocks, as it is in a separate path. Yet, it allows a reduced bandwidth shock signal to be applied to the position controller to compensate for external forces applied to the disk drive without large amounts of high frequency noise. This allows continued accurate writing in a track.

For the inhibiting write operation of the shock detection channel 400, the delay in the signal path may be minimized to correspond to the resonance frequency of 25 KHz typically found in the shock sensor 410. To remove the resonance frequency components from the output from the shock sensor 410, in an example embodiment the shock filter 420 has a high frequency cut off frequency of up to approximately 10 KHz to 14 KHz which is less than the resonance frequency of the shock sensor 410. For the ADC circuit 445, a high frequency cut off frequency may be substantially reduced to the realm of 1 KHz to 4 KHz, for example 2 KHz, in order to reduce the signals applied to a servo control loop from the feed forward filter 440. This may allow correction to the actuator arm 14 to accommodate induced vibration and applied vibration. The shock filter 420 and the feed forward filter 440 may also be implemented as low pass filters, allowing appropriate frequency signals to pass corresponding to the functions implemented in the respective paths. Analog or digital filters may be used as desired. In one example embodiment, both filters are analog filters.

It should be noted that the frequency response of the shock sensor 410 in an example embodiment is actually quite wide. Thus, a significant amount of noise is introduced, because the sensor 410 can actually act like a microphone. Even loud noises may be picked up.

Figure 9:
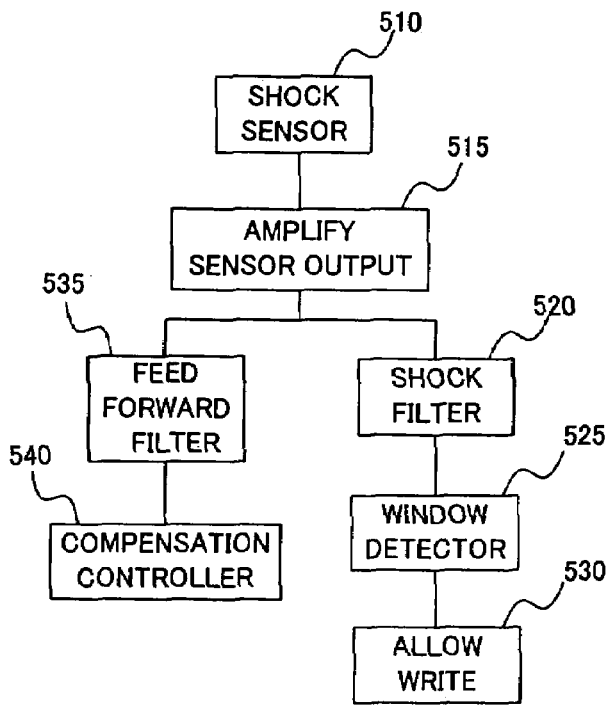
FIG. 9 is a flow diagram illustrating dual shock channel paths in parallel and corresponding control actions in each path according to an example embodiment.

FIG. 9 is a flow diagram illustrating a method, in accordance with an example embodiment, of processing of shock sensor output to provide separate write inhibit or shock compensation controls. At 510, a shock is sensed, such as by a shock sensor 410 and an output of the sensor 410 is amplified at 515. One path of the amplified sensor output is filtered at 520 to allow passage of a signal representing higher frequency shock forces that may result in writing of data on adjacent tracks. The filtered output is then detected by a window detector at 525 to either allow a write at 530 if the filtered output is within the window, or inhibit the write if the filtered output is outside the window.

A second path of the amplified sensor output 515 is filtered at 535 to allow passing of lower frequency shock forces that can be compensated for during writes to ensure that data is properly written in the data or other information tracks. A filtered signal from 535 is provided to a compensation controller 540 to compensate for such lower frequency shock forces during writes. In one example embodiment, the shock signal represents a force which would cause the head to deviate in one direction from the track during a write. This deviation may be derived from the signal, and a write control current may be applied to bring the write head back onto the track, or keep it from leaving the track in the first place.

Figure 10:
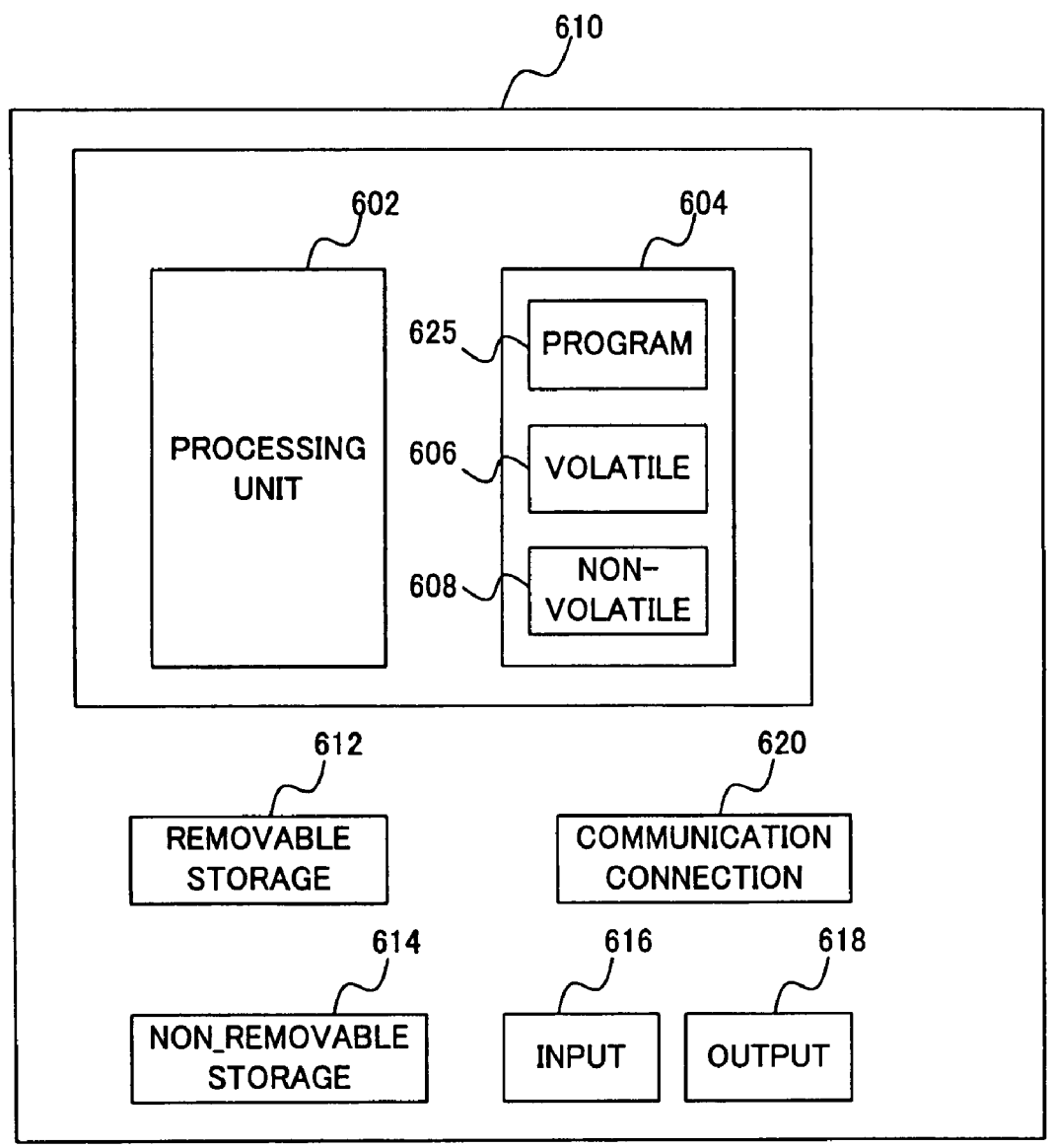
FIG. 10 is an example block diagram of a computer system for implementing functions and controllers described in accordance with example embodiments.

A block diagram of a computer system that executes programming for performing the above algorithm is shown in FIG. 10. A general computing device in the form of a computer 610, may include a processing unit 602, memory 604, removable storage 612, and non-removable storage 614. Memory 604 may include volatile memory 606 and non volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. The microprocessor 210 or other selected circuitry or components of the disk drive may be such a computer system.

Computer-readable instructions stored on a computer-readable medium are executable by the processing unit 602 of the computer 610. A hard drive, CD-ROM, and RAM are some examples of articles including a computer-readable medium. For example, a computer program 625 executed to control the writing of information associated with successive flush cache commands from a host computer 500 according to the teachings of the present invention may be included on a CD-ROM and loaded from the CD-ROM to a hard drive. The computer program may also be termed firmware associated with the disk drive. In some embodiments, a copy of the computer program 625 can also be stored on the disk 11 of the disk drive.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A disk drive apparatus comprising:
   a sensor to detect mechanical shocks to the disk drive apparatus and to provide a shock output signal representative of such mechanical shocks;
   a first filter coupled to the sensor to filter the shock output signal to pass signals having a first frequency component;
   a second filter to independently filter the shock output signal to provide signals having a second frequency component;
   a detector to inhibit write operations of the disk drive apparatus responsive to the shock output signal from the first filter; and
   a controller coupled to the second filter to compensate for low frequency mechanical disturbances during write operations to a track on the disk drive apparatus responsive to low frequency component.

2. The disk drive apparatus according to claim 1, wherein the sensor comprises a piezoelectric shock sensor.

3. The disk drive of claim 1, wherein the first filter has a cut-off frequency that is higher than a cut-off frequency of the second filter.

4. The disk drive apparatus according to claim 1, wherein the first frequency component is less than the resonance frequency of the sensor.

5. The disk drive apparatus according to claim 4, wherein the first frequency component is between 10 KHz and 14 KHz.

6. The disk drive apparatus according to claim 1, wherein the second frequency component is between 1 KHz to 4 KHz.

7. The disk drive according to claim 1, which comprises a window detector to detect when the shock output signal is in a voltage window having upper and lower predetermined values.

8. The disk drive according to claim 7, wherein write transfers are allowed when a magnitude of the shock signal is below the upper predetermined value, and write transfers are inhibited when the magnitude is outside the window.

9. The disk drive according to claim 1, wherein to compensate for mechanical disturbances comprises providing a feed forward correction signal to adjust servo tracking.

10. A method comprising:
detecting mechanical shocks to a disk drive to provide a shock output signal representative of such mechanical shocks;
filtering the shock output signal using a first filter that filters the shock output signal to provide signals having a first frequency component;
filtering the shock output signal using a second filter which is independent of the first filter to provide signals having a second frequency component;
inhibiting write operations of the disk drive responsive to the first frequency component of the shock output signal; and
compensating for low frequency mechanical disturbances during writing to a track on the disk drive responsive to the second frequency components of the shock output signal.

11. The method according to claim 10, wherein compensating for mechanical disturbances comprises providing a feed forward correction signal to adjust servo tracking.

12. The method according to claim 10, wherein the shock output signal is provided by a piezoelectric shock sensor.

13. The method according to claim 12, wherein the first frequency component is less than the resonance frequency of the piezoelectric shock sensor.

14. The method according to claim 13, wherein the first frequency components are approximately between 10 KHz to 14 KHz.

15. The method according to claim 10, wherein the second frequency components are approximately between 1 KHz to 4 KHz.

16. A disk drive apparatus comprising:
means for detecting mechanical shocks to the disk drive apparatus to provide a shock output signal representative of such mechanical shocks;
first means, coupled to the detecting means, for filtering the shock output signal to pass signals having a first frequency component;
second means, coupled to the detecting means in parallel with the first filtering means, for filtering the shock output signal to pass signals having a second frequency component;
means for inhibiting write operations of the disk drive apparatus responsive to the shock output signal passed through the first filtering means; and
means for compensating for low frequency mechanical disturbances during write operations to a track on the disk drive apparatus responsive to the shock output signal passed through the second filtering means.

17. The disk drive apparatus according to claim 16, wherein the detecting means comprises a piezoelectric shock sensor.

18. The disk drive apparatus according to claim 17, wherein the first frequency component is less than the resonance frequency of the piezoelectric shock sensor.

19. The disk drive apparatus according to claim 18, wherein the first frequency components are approximately between 10 KHz to 14 KHz.

20. The disk drive apparatus according to claim 16, wherein the second frequency components are approximately between 1 KHz to 4 KHz.

* * * * *